3,032,416
METHOD OF PRODUCING AN INSTANT COCOA
Jean-Jacques Scheidegger, Geneva, Switzerland, assignor to Comptoir Pharmaceutique d'Exportation S.A., a firm of Monaco
No Drawing. Filed Sept. 30, 1960, Ser. No. 59,506
Claims priority, application Switzerland Oct. 1, 1959
4 Claims. (Cl. 99—26)

This invention relates to a method of producing an instant cocoa, that is, a cocoa intended for the rapid preparation of beverages by simple dispersion in a liquid.

It is well known that cocoa sold commercially in powder form has the disadvantage of being very difficult to disperse in a liquid, since it forms clots and leaves a considerable deposit. Careful stirring is therefore necessary to prepare a drink, particularly in the case of a cold drink. Moreover, to obtain a quality beverage, such cocoa has to be boiled, and this is obviously another drawback, since the present tendency is towards "instant" products.

The object of the invention is to obviate the aforesaid disadvantages by proposing a method of producing an instant cocoa. This method is characterised in that cocoa in powder form is subjected to the action of steam under pressure so as to give a cooked cocoa powder having a water content of between 8 and 20% and this humidified powder is then granulated to give a product in the form of granules.

This process is performed in the following manner:

*Example No. 1*

One kg. of commercially sold cocoa powder is placed in a dry container which is disposed in an autoclave which in a double bottom contains a quantity of water sufficient to keep the atmosphere saturated with steam. Heating is effected and the pressure is allowed to rise to approximately 1.5 kg. per square cm. After approximately 3 minutes, the product has obtained sufficient humidity and is at the same time cooked. The pressure is then lowered and the hot and humidified powder is removed and is then granulated by means of a 0.5 mm. sieve. The product obtained in granule form is then spread out and allowed to dry.

The product obtained according to the above example is therefore a cocoa in the form of granules having a diameter of 0.5 mm. It can be used for the rapid preparation of drinks. It disperses rapidly both in a cold and a hot liquid. It does not form clots. Since the cocoa is already cooked, the drink is of an excellent quality. It is in fact an instant cocoa.

In the above example, the pressure of the steam and the period of treatment—the latter depending on the former—were respectively 1.5 kg. per square cm. and 3 minutes. The pressure, which depends on the temperature, could naturally be higher or lower, and this would entail a longer or shorter treatment period.

Instead of determining the treatment period in an atmosphere saturated with steam under pressure, in order to obtain the desired humidity of the cocoa powder, it would be possible to determine the amount of steam to be used. The following example shows such a way of performing the method.

*Example No. 2*

100 kg. of cocoa powder are placed in a container with heating walls, into which 4 kg. of water are introduced in the form of steam under pressure. The powder is allowed to adsorb the steam which will raise its water content to 11%. The humidified powder is then granulated and the resulting product is dried as in Example No. 1.

The granulation of the humidified cocoa powder could be effected by other means than a sieve. It has been found that the dispersion of cocoa in the form of granules having a diameter of 0.5 mm. is excellent, but this diameter could naturally have a different value. However, the selection of this value must be governed by the fact that granules of an excessive size disintegrate more slowly.

Since the granulation operation depends on the humidity of the cocoa powder to be granulated, it is very important that the amount of steam to be used should be appropriately chosen. This quantity must be so selected that the water content in the cocoa powder leaving the autoclave is between 8 and 20%.

It should be noted that in order to facilitate the penetration of the steam into the treated cocoa powder, it is advantageous to agitate this powder during the treatment. Thus in the example given the container holding the powder could be equipped with an agitator device.

The method according to the invention may be advantageously applied to the production of instant product intended for the preparation of sweetened cocoa and cocoa-based tonic drinks.

It is well known that these products are at present put on the market in two distinct forms:

(a) Simple mixtures of cocoa and sugar, or cocoa, sugar and other ingredients, finely ground, having the appearance of a flour of rather plate colour.

(b) Products obtained by drying a liquid preparation containing cocoa, sugar and other ingredients. Drying is effected by known processes, such as evaporation in vacuo on hot plates, spraying, and so on. Since these products are prepared in the liquid phase, the cocoa can undergo normal cooking. They are of a more homogeneous appearance and of a deeper colour than the products under (a) and their fineness varies according to the drying process used.

These products, however have the disadvantage of being of a high cost price in view of the cost of the drying installations and power required for evaporating large quantities of water.

With regard to the products under (a), which contain cocoa in powder form as sold commercially, it is obvious that they have the same disadvantages as this cocoa.

The invention therefore also relates to the application of the process described hereinabove to the production of an instant product intended for the rapid preparation of a cocoa-based tonic drink. This application is characterised in that a homogeneous mixture of cocoa in powder form, sugar and the required ingredients is prepared and subjected to the action of steam under pressure so as to obtain a powder containing cooked cocoa and having a water content between 8 and 20%, and this humidified powder is then granulated to obtain a product in the form of granules.

The following examples show the way in which this application may be effected.

*Example No. 3*

One part of cocoa in powder form is mixed with one part of crystallised sugar in powder form. This mixture is introduced into a dry container which is placed in an autoclave, and is subjected to the action of steam under a pressure of approximately 1.5 kg. per square cm. for about three minutes while being constantly agitated and protected from any contact with water originating from possible condensation. The mixture in the form of a hot and humidified powder is then granulated by means of a sieve. The product obtained in granules form is then spread out and allowed to dry. The resulting product is therefore a sweetened cocoa intended for the rapid prepartion of a quality drink.

Example No. 4

A homogeneous mixture of the following powders is prepared: 30 parts of cocoa, 55 parts of sugar, 6 parts of powdered milk, 7 parts of malt extract, 1 part of lecithin, 0.5 part of calcium phosphate and 0.5 part of magnesia phosphate. This mixture is treated in an autoclave and granulated as in Examples 1-3, so as to give a product in the form of granules having a diameter of 1 mm. for example.

The resulting product is therefore a cocoa-based product intended for the rapid preparation of a tonic drink.

What I claim is:

1. In a method of producing an instant cocoa product employing a commercial grade of cocoa as a source of cocoa for thhe product, the art which includes, cooking the commercial grade of cocoa in powder form under superatmospheric pressure in an atmosphere saturated with steam while maintaining conditions where the humidity of the powder is increased substantially exclusively by the steam and accordingly providing a cooked powder having a water content between 8% and 20%, and granulating this cooked humid powder to provide an instant cocoa product having granular form.

2. In a method of producing an instant cocoa product employing a commercial grade of cocoa as a source of cocoa for the product, the art which includes, cooking the commercial grade of cocoa in powder form under superatmospheric pressure in an atmosphere saturated with steam while constantly agitating the powder and maintaining conditions where the humidity of the powder is increased substantially exclusively by the steam and accordingly providing a cooked powder having a water content between 8% and 20%, and granulating this cooked humid powder to provide an instant cocoa product having granular form.

3. In a method of producing an instant cocoa product employing a commercial grade of cocoa as a source of cocoa for the product, the art which includes, cooking a mixture of commercial grade cocoa in powder form and powdered sugar under superatmospheric pressure in an atmosphere saturated with steam while maintaining conditions where the humidity of the powder is increased substantially exclusively by the steam and accordingly providing a cooked sweet cocoa product having a water content between 8% and 20%, and granulating this cooked humid product to provide an instant sweet cocoa having granular form.

4. In a method of producing an instant cocoa product employing a commercial grade of cocoa as a source of cocoa for the product, the art which includes, cooking a mixture of commercial grade cocoa in powder form and powdered sugar under superatmospheric pressure in an atmosphere saturated with steam while constantly agitating the materials of the powder and maintaining conditions where the humidity of the powder is increased substantially exclusively by the steam and accordingly providing a cooked sweet cocoa product having a water content between 8% and 20%, and granulating this cooked humid product to provide an instant sweet cocoa having granular form.

References Cited in the file of this patent

UNITED STATES PATENTS 2,850,388    Peebles et al. _____ Sept. 2, 1958